(12) United States Patent
Aono et al.

(10) Patent No.: US 9,252,978 B2
(45) Date of Patent: Feb. 2, 2016

(54) MOBILE TERMINAL

(75) Inventors: Tomotake Aono, Yokohama (JP); Junichi Ujii, Yokohama (JP); Tetsuya Takenaka, Yokohama (JP)

(73) Assignee: Kyocera Coporation, Kyoto (JP)

( * ) Notice: Subject to any disclaimer, the term of this patent is extended or adjusted under 35 U.S.C. 154(b) by 580 days.

(21) Appl. No.: 12/745,534

(22) PCT Filed: Nov. 28, 2008

(86) PCT No.: PCT/JP2008/071640
§ 371 (c)(1),
(2), (4) Date: May 28, 2010

(87) PCT Pub. No.: WO2009/069744
PCT Pub. Date: Jun. 4, 2009

(65) Prior Publication Data
US 2010/0318621 A1    Dec. 16, 2010

(30) Foreign Application Priority Data

Nov. 29, 2007 (JP) ................................. 2007-308561

(51) Int. Cl.
*G06F 15/16* (2006.01)
*H04L 12/58* (2006.01)
(Continued)

(52) U.S. Cl.
CPC ............ *H04L 12/5895* (2013.01); *H04L 51/38* (2013.01); *H04M 1/72552* (2013.01); *H04W 4/18* (2013.01)

(58) Field of Classification Search
CPC ........................... H04L 12/5895; H04L 51/38

USPC ........................................................ 709/206
See application file for complete search history.

(56) References Cited

U.S. PATENT DOCUMENTS 5,987,234 A * 11/1999 Hirosawa et al. ............. 709/224
2004/0054428 A1 * 3/2004 Sheha et al. .................... 700/56
(Continued)

FOREIGN PATENT DOCUMENTS

| JP | 10-341476 | 12/1998 |
| JP | 2001-337896 | 12/2001 |

(Continued)

OTHER PUBLICATIONS

The Notice of Preliminary Rejection (translation) for KR 10-2010-7011898, mailed Jun. 23, 2011, 3 pages.
International Search Report for PCT/JP2008/071640, mailed on Jan. 13, 2009, 2 pages.

*Primary Examiner* — Karen Tang
(74) *Attorney, Agent, or Firm* — Duane Morris LLP

(57) ABSTRACT

A transmission side terminal 10 is provided with a transmission and reception unit 20 for transmitting and receiving an e-mail and an e-mail composing unit 32 for composing an e-mail including a special character for inquiry having associated therewith an information reply request, which is to obtain information on a destination mobile terminal of the e-mail to be transmitted. A reception side terminal 10 is provided with the transmission and reception unit 20, a determination unit 34 for determining whether a received e-mail includes a special character for inquiry, and a reply e-mail composing unit 32, when it is determined that the received e-mail includes the special character for inquiry, for composing a reply e-mail including a special character for reply with which reply information in accordance with the information reply request is associated.

6 Claims, 15 Drawing Sheets

(51) Int. Cl.
*H04M 1/725* (2006.01)
*H04W 4/18* (2009.01)

(56) References Cited

U.S. PATENT DOCUMENTS

| | | | |
|---|---|---|---|
| 2006/0223518 A1* | 10/2006 | Haney | 455/420 |
| 2008/0070588 A1* | 3/2008 | Morin | 455/456.1 |
| 2011/0021211 A1* | 1/2011 | Ohki | 455/456.3 |
| 2014/0365590 A1* | 12/2014 | Boss et al. | 709/206 |

FOREIGN PATENT DOCUMENTS

| | | |
|---|---|---|
| JP | 2002-262338 | 9/2002 |
| JP | 2004-198245 | 7/2004 |
| JP | 2006-172110 | 6/2006 |
| JP | 2006-229304 | 8/2006 |
| JP | 2007-306056 | 11/2007 |
| KR | 2006-0075418 | 7/2006 |

\* cited by examiner

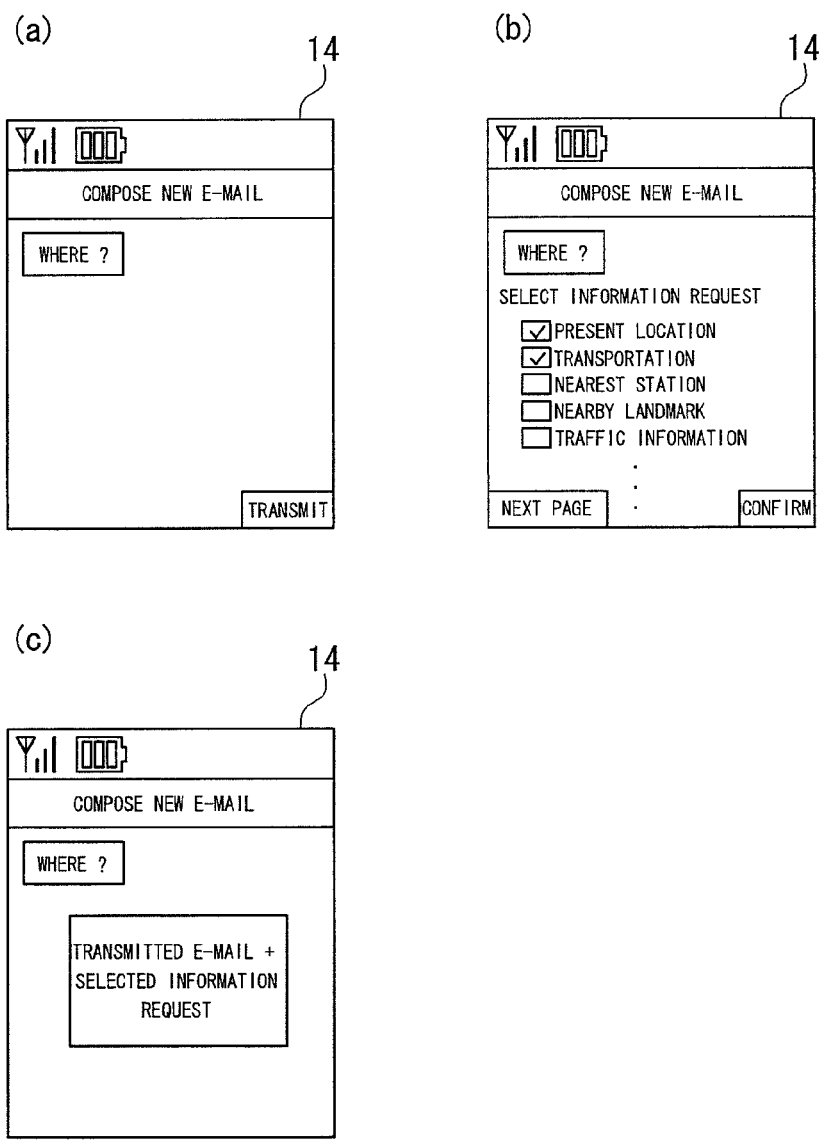

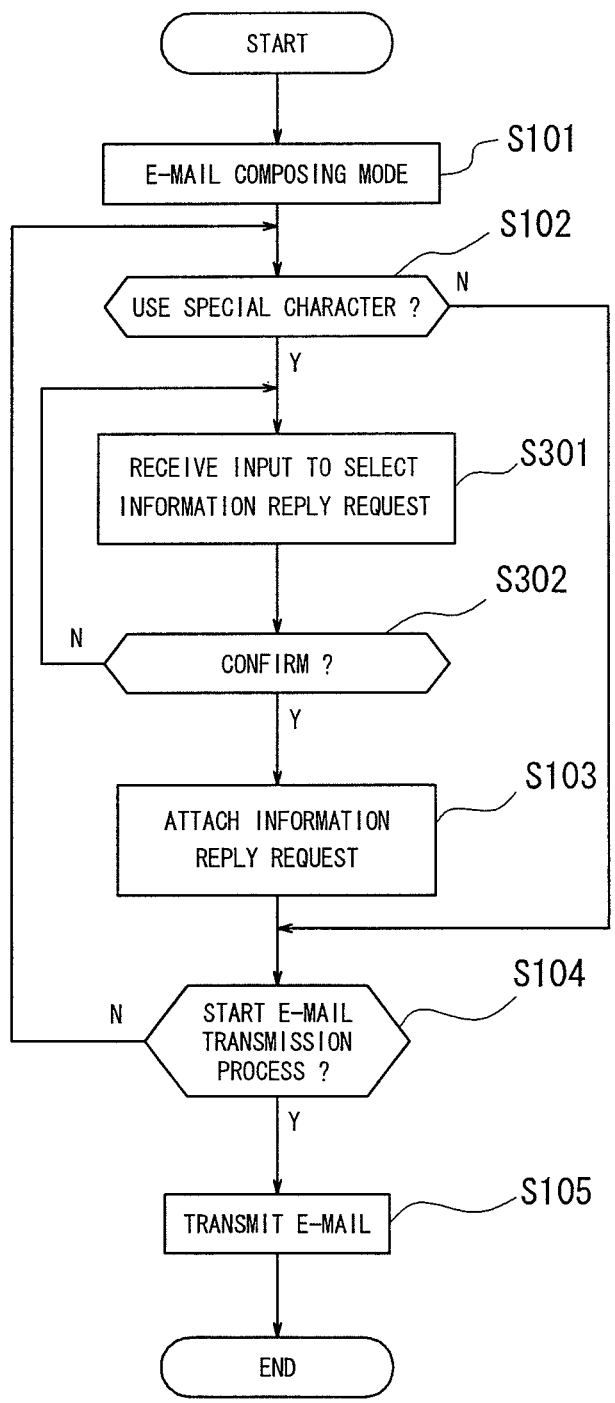

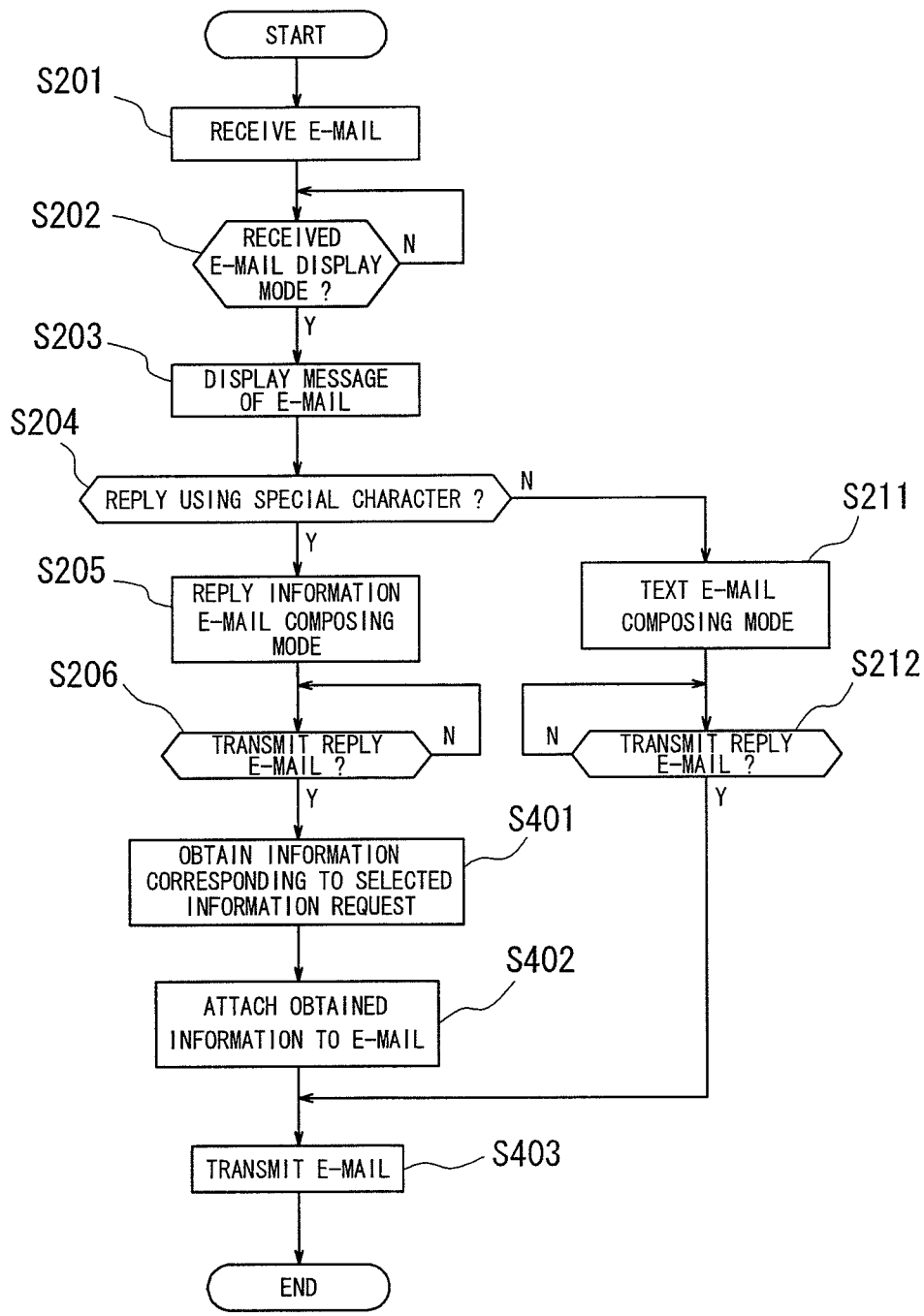

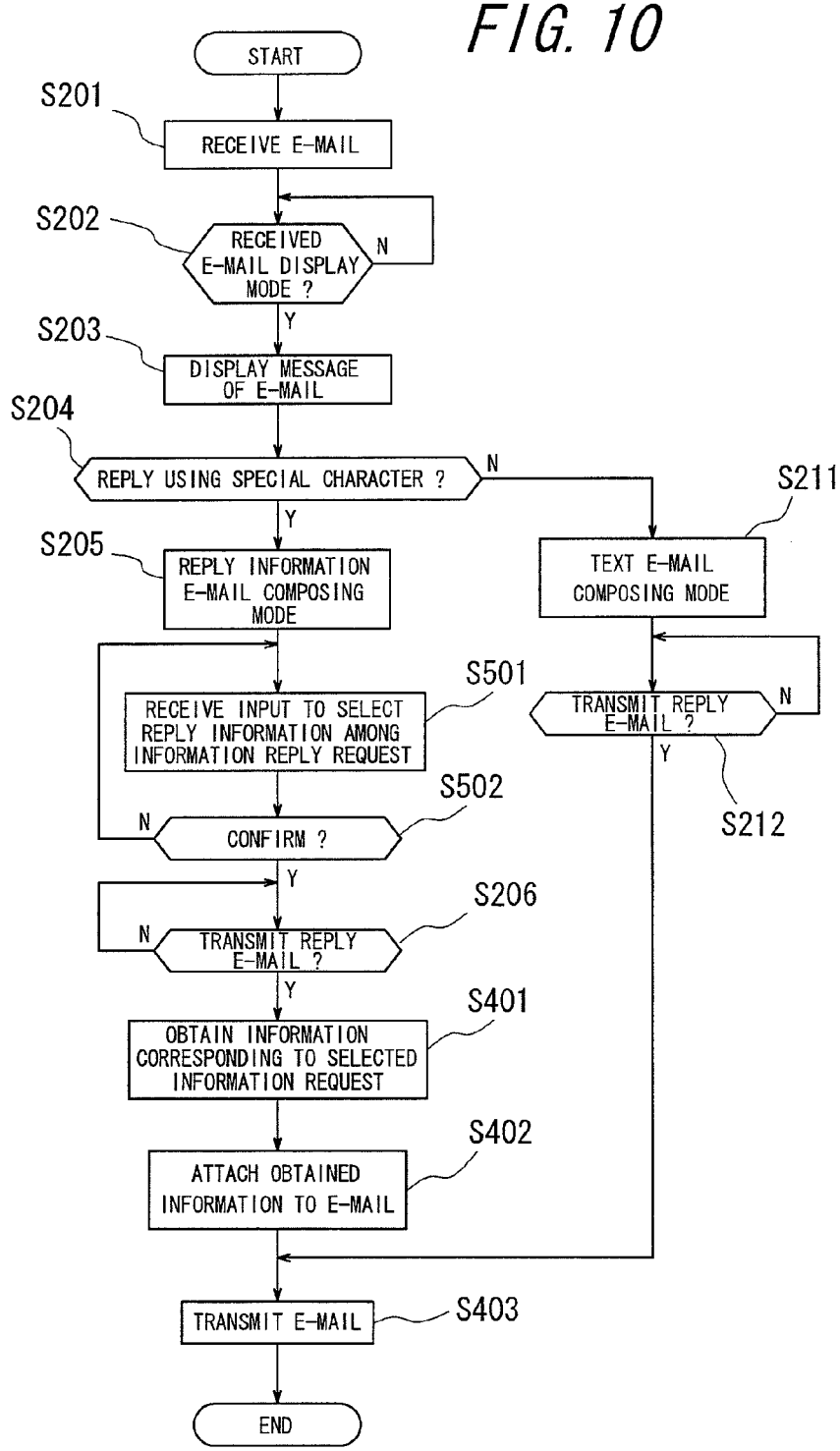

FIG. 11

(a) RECEIVED E-MAIL
from Mr.A
WHERE ?
MENU  SELECT  NORMAL REPLY (b) COMPOSE REPLY E-MAIL
HERE !
SELECT REPLY INFORMATION
☑ PRESENT LOCATION
☑ TRANSPORTATION
☑ NEAREST STATION
☐ NEARBY LANDMARK
CONFIRM (c) COMPOSE REPLY E-MAIL
HERE !
SELECT REPLY INFORMATION
☑ PRESENT LOCATION
  (AUTOMATIC ACQUISITION)
☑ TRANSPORTATION
  · AUTOMATIC DISCRIMINATION
  · TRAIN
  · BUS
  · CAR
  · ON FOOT
  · NON
CONFIRM (d) COMPOSE REPLY E-MAIL
HERE !
TRANSMIT (e) COMPOSE REPLY E-MAIL
HERE !
OBTAINING SELECTED REPLY INFORMATION (f) COMPOSE REPLY E-MAIL
HERE !
TRANSMITTED E-MAIL + SELECTED REPLY INFORMATION

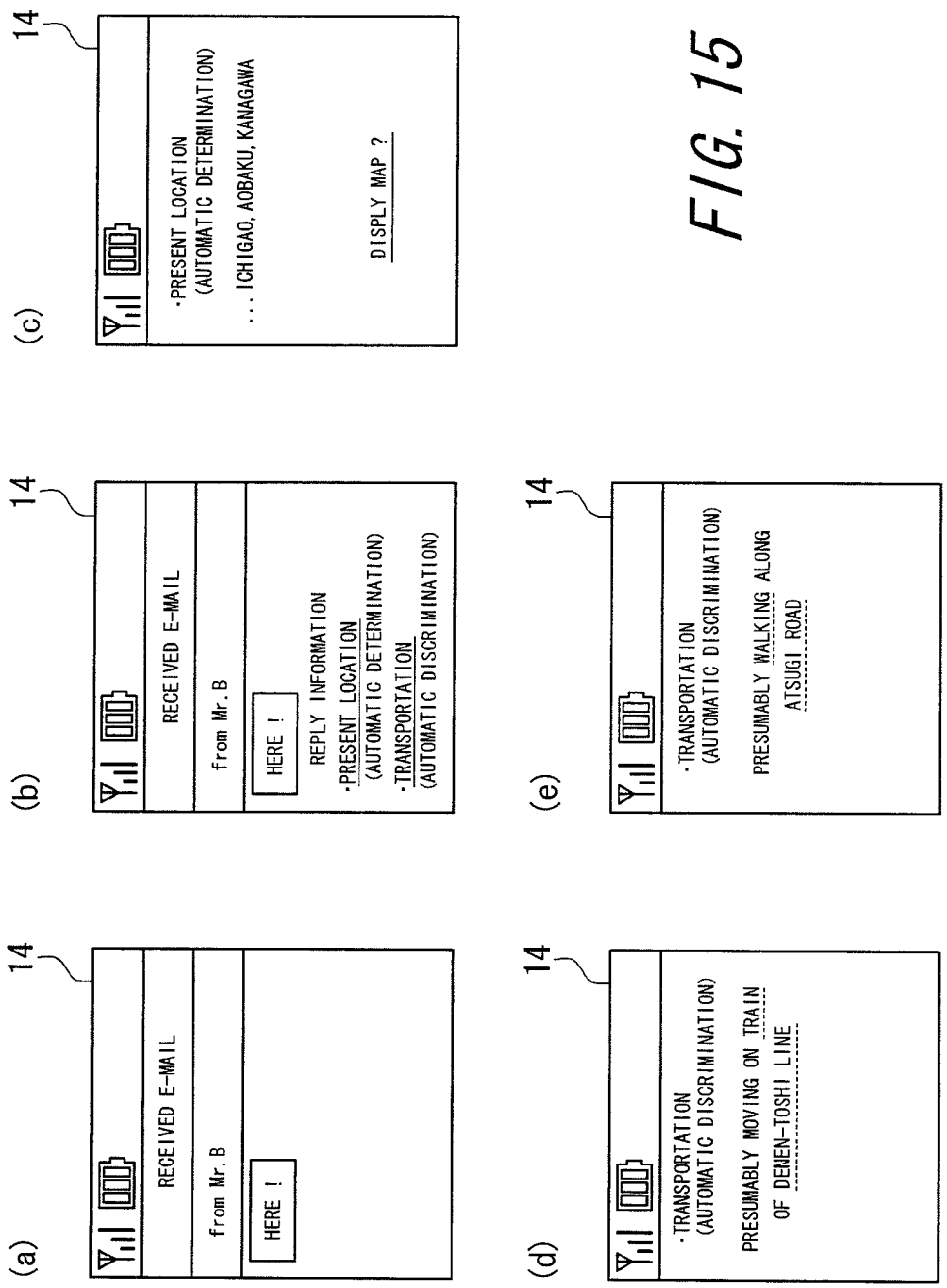

MOBILE TERMINAL

CROSS REFERENCE TO RELATED APPLICATION APPLICATIONS

This application is a U.S. national phase application of International Application No. PCT/JP2008/071640 filed Nov. 28, 2008, which claims priority to and the benefit of Japanese Patent Application No. 2007-308561 filed on Nov. 29, 2007. The contents of these applications are herein incorporated by reference in their entirety.

TECHNICAL FIELD

The present invention relates to mobile terminals, and more particularly, to mobile terminals capable of transmitting and receiving e-mails.

BACKGROUND ART

In recent years, mobile terminals including cellular phones are widely and commonly used, and the number of users has been increasing. In particular, recently, exchanging messages between the users of the mobile terminals through transmission/reception of e-mails by use of mobile terminals such as a cellular phone and PDA is widely and routinely performed. Moreover, the mobile terminals are equipped with various function units and application programs such as a digital camera, GPS (Global Positioning System) and non-contact IC card function, for example. These days, mobile terminals are thus multifunctional, improving convenience for users significantly.

In Japan, due to a revision of the Ordinance of the Ministry of Internal Affairs and Communications (Regulations for Telecommunications Facilities for Telecommunications Business), the 3G (third generation) cellular phone terminals released on and after April 2007 are required to have a function for notifying the departments concerned of the location information of the terminal at the time of transmission of an emergency message. Under such a circumstance, it seems that the GPS (Global Positioning System) in particular will be spread even more widely among the functions incorporated in the mobile terminals. There have been suggested a variety of mobile terminals having navigating functions by the GPS, including one described in Japanese Patent Application Laid-Open No. 10-341476.

The cellular phone described in the Japanese Patent Application Laid-Open No. 10-341476 can, as a normal cellular phone, communicate with another cellular phone by radio and, in addition display the present location obtained by a GPS reception unit and a GPS image data generation routine on a liquid crystal display by a map, whereby the user of the cellular phone can know his/her present location almost exactly.

The user moving with such a cellular phone may use the GPS function as a usable guide. Thereby, the cellular phone can significantly reduce a risk that he/she gets lost and cannot arrive at a destination, even if a meeting spot designated is where the user has never been before.

However, an intended usage of the GPS is normally to obtain the location information of the mobile terminal. Therefore, the cellular phone described in Japanese Patent Application Laid-Open No. 10-341476 cannot provide the present location of a mobile terminal of a corresponding party supposed to meet but provides only the present location of the mobile terminal itself.

When the user wishes to know the present location of the corresponding party, for example, if the corresponding party carries a cellular phone, it is possible to obtain the present location of the corresponding party through wireless communications or e-mails with the corresponding party. However, it could be a considerable burden for the corresponding party to verbally describe his/her present location and, in some cases, it may be difficult for the corresponding party to talk or explain on the phone, such as when the corresponding party is on a train. In addition, it may be a troublesome task for the corresponding party to write the present location in e-mail, and further, there may be some cases where the corresponding party cannot successfully describe the present location by using textual information. It may happen that the corresponding party has no idea about the present location if he/she is unfamiliar with the place.

In order to deal with such problems, Japanese Patent Application Laid-Open No. 2002-262338, for example, discloses a technique in which each of the mobile terminal of the user and the mobile terminal of the corresponding party is provided with the GPS function and obtains its location information from a GPS satellite. According to this technique, the user can obtain even the location information of the corresponding party from a location information service center by using his/her mobile terminal and also map information from a map information database.

A mobile communication terminal described in the Japanese Patent Application Laid-Open No. 2002-262338, enables the user to obtain the present location information of the mobile terminal of his/her mobile terminal as well as the present location information of the mobile terminal of the corresponding party. Moreover, this mobile communication terminal can show not only the user's location but also the corresponding party's location on a map displayed on a display unit of the user's mobile terminal. It is thus possible to easily locate the present location of the corresponding party. Hence, according to the mobile communication terminal described in the Japanese Patent Application Laid-Open No. 2002-262338, it is possible to easily recognize a locational relationship between him/her and the corresponding party.

SUMMARY OF INVENTION

Technical Problems

In light of privacy protection, however, such a condition which enables anyone to know other parties' locations anytime as necessary may cause a problem. Hence, in operating a technique as such, both of a party who wishes to know the present location and the other party to inform the present location of himself/herself need to subscribe an additional service and the likes in advance to provide location information. That is, it is necessary for the party who wishes to inform his/her location to take measures by subscribing the service and specifying other party to which disclosure of his/her location information is permitted. Alternatively, it is necessary to introduce a system in which the user asks permission for the location of the other party each time he/she wishes to obtain it (by a means such as a wireless communication) and, only when the user can get permission, the location information of the other party is disclosed.

According to the technique disclosed in Japanese Patent Application Laid-Open No. 2002-262338, it is required that an ID number specifying the other party whose location information the user wishes to obtain is obtained in advance and registered with the mobile terminal of the user who wishes to obtain the location information of the other party. In addition, it is assumed that the mobile terminal uses a PIN number to use a location information service. Furthermore, the mobile terminal of the other party whose location information the user wished to obtain is practically configured to provide the present location information thereof only to intended parties while preventing the present location information from being obtained by general public. In order to achieve that, it is necessary to introduce measures such that the mobile terminal of the corresponding party must pass through steps to permit disclosure of the location information thereof.

However, such configuration to pass through specific authorization steps in order to ask for permission for disclosure of the information of the corresponding party requires considerable time and effort for both of the user and the corresponding party. With such considerable time and effort required, there is not much difference from a case where the user calls the corresponding party to ask the location or asks the corresponding party to describe the location in the e-mail.

Moreover, there may be a case where the user waiting for the other party late wishes to know not only the location information of the other party but also other information. For example, the user waiting for the other party may wish to know additional information such as transportation being used by the other party as well as the present location of the other party, so as to guess when the other party will arrive and reduce a time waiting idly. However, it also requires considerable time and effort for both the user and the other party if the user inquires the other party about the additional information by sending an e-mail and the other party receiving the inquiry composes a reply e-mail to describe the additional information.

Accordingly, it is an object of the present invention, in consideration of such problems, to provide a transmission side mobile terminal capable of easily and quickly compose an e-mail requesting information such as the present location of the corresponding party. Moreover, it is also an object of the present invention to provide a reception side mobile terminal capable of easily and quickly composing and transmitting an e-mail containing information such as the present location of itself only to an intended party based on a received e-mail requesting the information.

Solutions To Problems

In order to achieve the above object, the invention of a mobile terminal in accordance with a first aspect includes:

a transmission and reception unit for transmitting and receiving an e-mail; and an e-mail composing unit for composing an e-mail including a special character with which an information reply request is associated, wherein the information reply request is to obtain information on a destination mobile terminal of the e-mail, which is transmitted by the transmission and reception unit.

In accordance with a second aspect of the present invention, in the mobile terminal in accordance with the first aspect, the e-mail composing unit further includes a selection unit for selecting information on the destination mobile terminal to request, and composes the e-mail by associating the information reply request, which is to obtain the information selected by the selection unit, with the special character.

The invention of a mobile terminal in accordance with a third aspect includes:

a transmission and reception unit for transmitting and receiving an e-mail;

a determination unit for determining whether an e-mail received by the transmission and reception unit includes a special character for inquiry with which an information reply request requesting reply with information on the mobile terminal is associated; and a reply e-mail composing unit, if the determination unit determines that the special character for inquiry is included, for composing a reply e-mail including a special character for reply with which reply information in accordance with the information reply request is associated.

In accordance with a fourth aspect of the present invention, in the mobile terminal in accordance with the third aspect, the reply e-mail composing unit further includes a selection unit for selecting a desired item from items of the information reply request, and composes the reply e-mail by associating the reply information in accordance with the item of the information reply request selected by the selection unit with the special character for reply.

In accordance with a fifth aspect of the present invention, the mobile terminal in accordance with the third aspect further includes a location information obtaining unit for obtaining location information of the mobile terminal, and the reply e-mail composing unit composes the reply e-mail including the location information of the mobile terminal obtained by the location information obtaining unit.

In accordance with a sixth aspect of the present invention, the mobile terminal in accordance with the fifth aspect further includes a timing unit for measuring present time, and the reply e-mail composing unit composes the reply e-mail including estimated transportation information of the mobile terminal, estimated based on the location information of the mobile terminal obtained by the location information obtaining unit and time information obtained by the timing unit.

BRIEF DESCRIPTION OF DRAWINGS

FIG. 7 is a diagram illustrating examples of display on the display unit of the reception side terminal according to the second embodiment;

FIG. 8 is a flowchart illustrating the operation to transmit the e-mail by the transmission side terminal according to the second embodiment;

FIG. 9 is a flowchart illustrating the operation to receive the e-mail and reply by the reception side terminal according to the second embodiment;

FIG. 10 is a flowchart illustrating the operation to receive the e-mail and reply by the reception side terminal according to a third embodiment;

FIG. 11 is a diagram illustrating examples of display on the display unit of the reception side terminal according to the third embodiment;

FIG. 15 is a diagram illustrating examples of display on the display unit of the transmission side terminal when receiving the reply e-mail according to the fourth embodiment.

Figure 1:
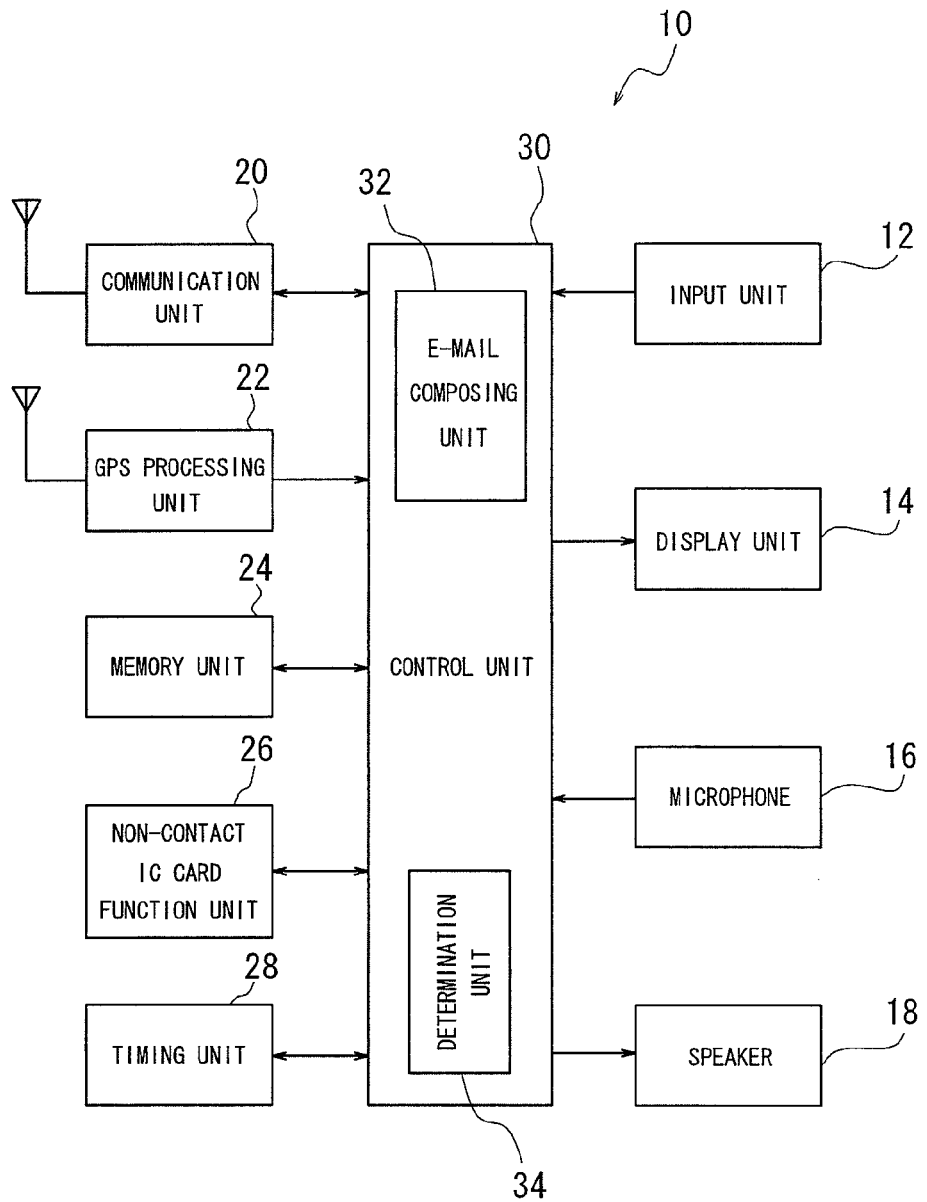
FIG. 1 is a functional block diagram illustrating a schematic configuration of a cellular phone according to a first embodiment of the present invention.

REFERENCE SIGNS LIST 10 mobile terminal
12 input unit
14 display unit
16 microphone
18 speaker
20 communication unit
22 GPS processing unit
24 memory unit
26 non-contact IC card function unit
28 timing unit
30 control unit
32 e-mail composing unit
34 determination unit

DESCRIPTION OF THE PREFERRED EMBODIMENTS

Embodiments of the present invention will be described below with reference to the drawings. In each of the embodiments described below, a cellular phone is taken as an example of a mobile terminal of the present invention. However, the mobile terminal of the present invention is not limited to a cellular phone but is applicable to mobile communication terminals such as, for example, a PDA and the like. Further, in the following description, a terminal that transmits an e-mail including an information reply request to inquire location information of a corresponding party is referred to as a "transmission side" terminal and a terminal that receives the e-mail including the information reply request is referred to as a "reception side" terminal.

According to each embodiment of the present invention, since two cellular phones having the same specification are used, and one can be a transmission side terminal and the other can be a reception side terminal, explanation is given on the assumption that the cellular phones used on the transmission and on the reception sides have the same specification.

First Embodiment

FIG. 1 is a functional block diagram illustrating a schematic configuration of a cellular phone 10 according to a first embodiment of the present invention.

As shown in FIG. 1, a cellular phone 10 is provided with an input unit 12, a display unit 14, a microphone 16 and a speaker 18. The input unit 12 is constituted of an operation key group and the likes to receive input by a user. The display unit 14 is constituted of a liquid crystal display, an organic EL display or the like to display a variety of information such as a result of input to the input unit 12. The microphone 16 receives audio input, whereas the speaker 18 outputs audio.

The cellular phone 10 is further provided with a communication unit 20, a GPS processing unit 22, a memory unit 24, a non-contact IC card function unit 26, a timing unit 28, a control unit 30 for controlling the cellular phone 10 entirely including above function units. The communication unit 20 constitutes a transmission/reception unit for transmitting and receiving information including audio data and e-mail data to and from a base station (not shown) via an antenna. The GPS processing unit 22 constitutes a location information obtaining unit for receiving GPS information (for example, latitude and longitude data) via a GPS antenna and converting the GPS information into data which can be processed by the cellular phone 10. The memory unit 24 stores various kinds of information such as input information, application programs and the likes. The non-contact IC card function unit 26 performs a short distance radio communication with various external terminals (not shown). The timing unit 28 measures present time. In the following description, the application program is abbreviated to "application".

The control unit 30 includes an e-mail composing unit 32 and a determination unit 34. The e-mail composing unit 32 retrieves an e-mail composing application from the memory unit 24 and controls a sequence of composition of the e-mail based on input to the input unit 12 by the user. The determination unit 24 determines whether data constituting a predetermined special character is included in a received e-mail by the communication unit 20.

The input unit 12 may be a key operation unit (not shown) having a plurality of mechanical keys or may be a touch panel (not shown) that is superimposed on the front face of the display unit 14, in accordance with the specification of the cellular phone 10. In addition, for convenience of explanation, the memory unit 24 is explained as a unit not only for storing input information and various applications and the like, but also for serving as a work memory or a buffer.

The GPS processing unit 22 is controlled by the control unit 30 to receive radio waves from a GPS satellite by using the GPS antenna and thereby calculates the location information (for example, latitude and longitude) of the terminal itself. The non-contact IC card function unit 26 performs a non-contact communication for an electric payment. The user can perform the electric payment automatically in a non-contact manner by holding the non-contact IC card function unit of a terminal body over an IC card reader/writer connected to a POS (Point Of Sales) terminal in a shop. Moreover, the non-contact IC card function unit enables a railway company to automatically withdraw a fare from a previously charged (stored) money at a point where the user passes through an automatic ticket gate in accordance with a service provided by the company or may function as a commuter pass by being registered in advance.

It is to be noted that since each function unit of the cellular phone 10 of the present invention may have the same constitution as those of a conventional cellular phone having a general GPS function and a non-contact IC card function mounted therein, a detailed description of each function unit is omitted.

Figure 2:
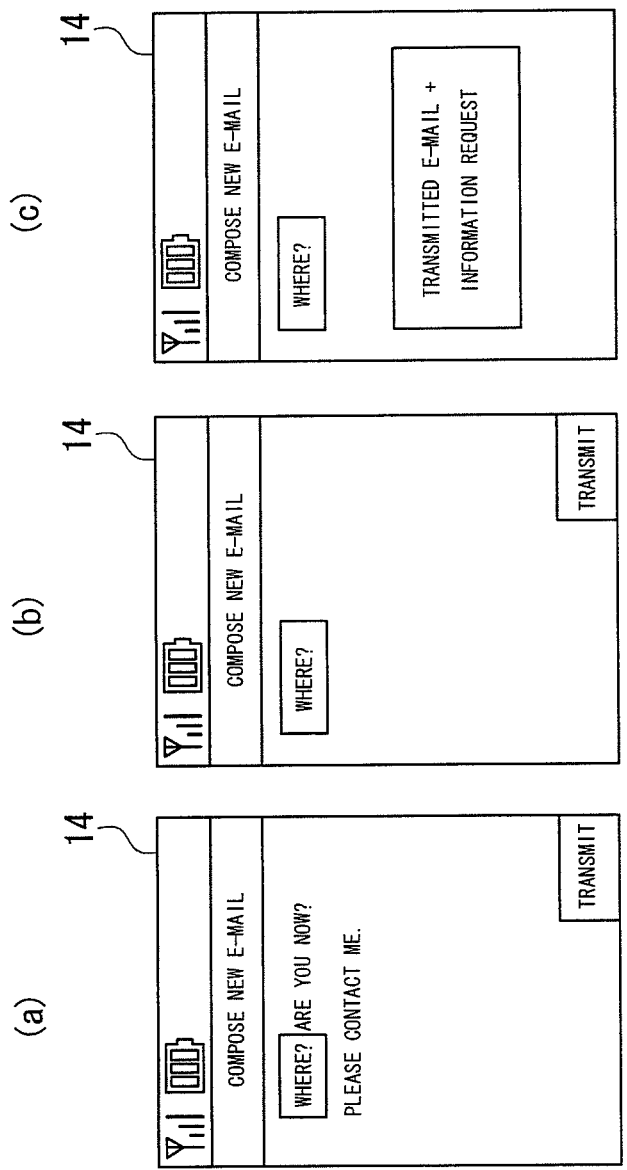
FIG. 2 is a diagram illustrating examples of display on a display unit of a transmission side terminal according to the first embodiment.
Figure 3:
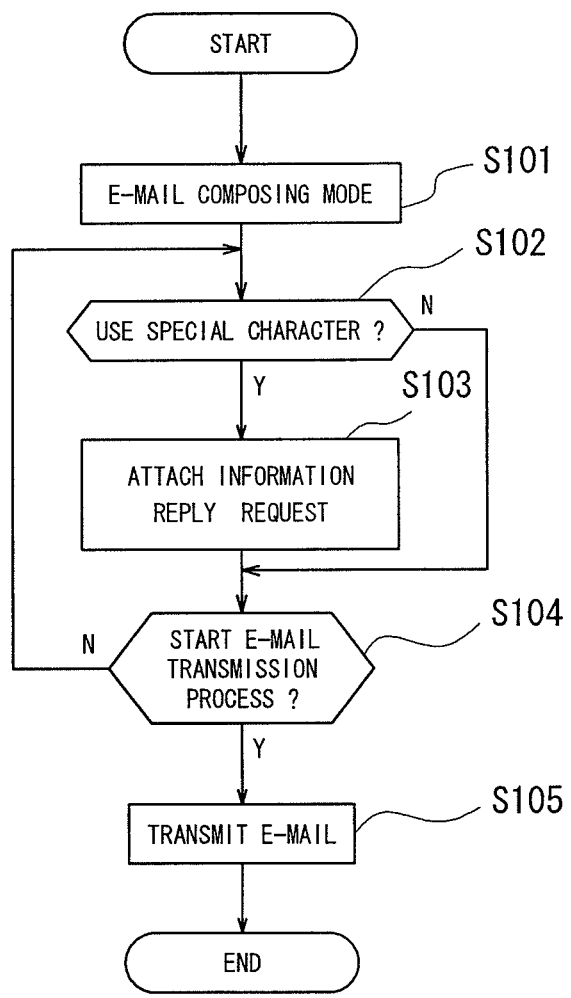
FIG. 3 is a flowchart illustrating an operation to transmit an e-mail by the transmission side terminal according to the first embodiment.

The following is a description of an operation of a transmission side cellular phone 10 according to the present embodiment to transmit the e-mail, with reference to examples of display on a screen in FIG. 2 and a flowchart in FIG. 3.

First, when a user operates the transmission side terminal to start writing an e-mail inquiring about a present location of a corresponding party, the e-mail composing unit 32 of the cellular phone 10, the transmission side terminal, retrieves and executes the e-mail composing application from the memory unit 24. Thereby, the operation shifts to an e-mail composing mode to compose an e-mail (step S101). In the e-mail composing mode, the display unit 14 is controlled by the e-mail composing unit 32 to display characters of the e-mail in response to user input to the input unit 12.

In the present embodiment, when the user of the cellular phone 10 of the transmission side terminal inquires about information of the corresponding party through an e-mail in order to know a present location of the corresponding party whom the user is supposed to meet for example, the user includes the predetermined special character (special character for inquiry) to facilitate a response by the corresponding party in the e-mail. The special character for inquiry may take any forms such as, for example, a special character, a symbol, a pictorial symbol, a picture, a mark and an icon, as long as they are distinguishable from normal characters used in the e-mail.

For example, the user can compose an e-mail with a message such as "'WHERE?' are you? Please contact me." including a pictorial symbol depicting 'WHERE?' as the predetermined special character for inquiry, as shown in FIG. 2(*a*). However, it is also possible to inquire about the present location of the corresponding party by sending only the special character for inquiry. Hence, the present example describes a case where the e-mail includes only a single special character for inquiry such as 'WHERE?' as shown in FIG. 2(*b*).

In the e-mail composing mode, when the special character for inquiry is detected in the e-mail being written (Yes at step S102), the e-mail composing unit 32 attaches an information reply request, which is information requesting the reception side terminal to reply with its location information, to the e-mail by associating the information reply request with the special character for inquiry (step S103).

When composing the e-mail is completed, the control unit 30 determines whether the user has input using the input unit 12 to start a transmission process of the e-mail composed (step S104). After input to start the e-mail transmission process, that is, when an icon "TRANSMIT" shown in a lower right of FIG. 2(*b*) is selected, the control unit 30 encodes data of the e-mail and controls the communication unit 20 to transmit the encoded data to the reception side terminal via the base station (step S105), and then ends the e-mail transmission process. At this time, it is possible to indicate to the user that the information reply request has been sent together with a message of the e-mail (the special character only, in the present example), by showing a screen as shown in FIG. 2(*c*) on the display unit 14.

If the special character for inquiry is not used in the e-mail to transmit at the step S102, it means that characters are input to a normal e-mail without the information reply request attached thereto. When the special character for inquiry is not used, the e-mail transmission process thereafter is the same as a normal e-mail transmission process.

In the present embodiment as described above, the user who wishes to know the present location of the corresponding party can transmit a reply request about the location information by a significantly simple and quick operation to include the special character for inquiry in the e-mail when composing a usual normal e-mail. That is, it is possible to make an inquiry about the present location of the corresponding party by the same sequence as to compose the usual e-mail or by composing the e-mail containing only the special character for inquiry to simply request for the location information of the corresponding party.

Figure 4:
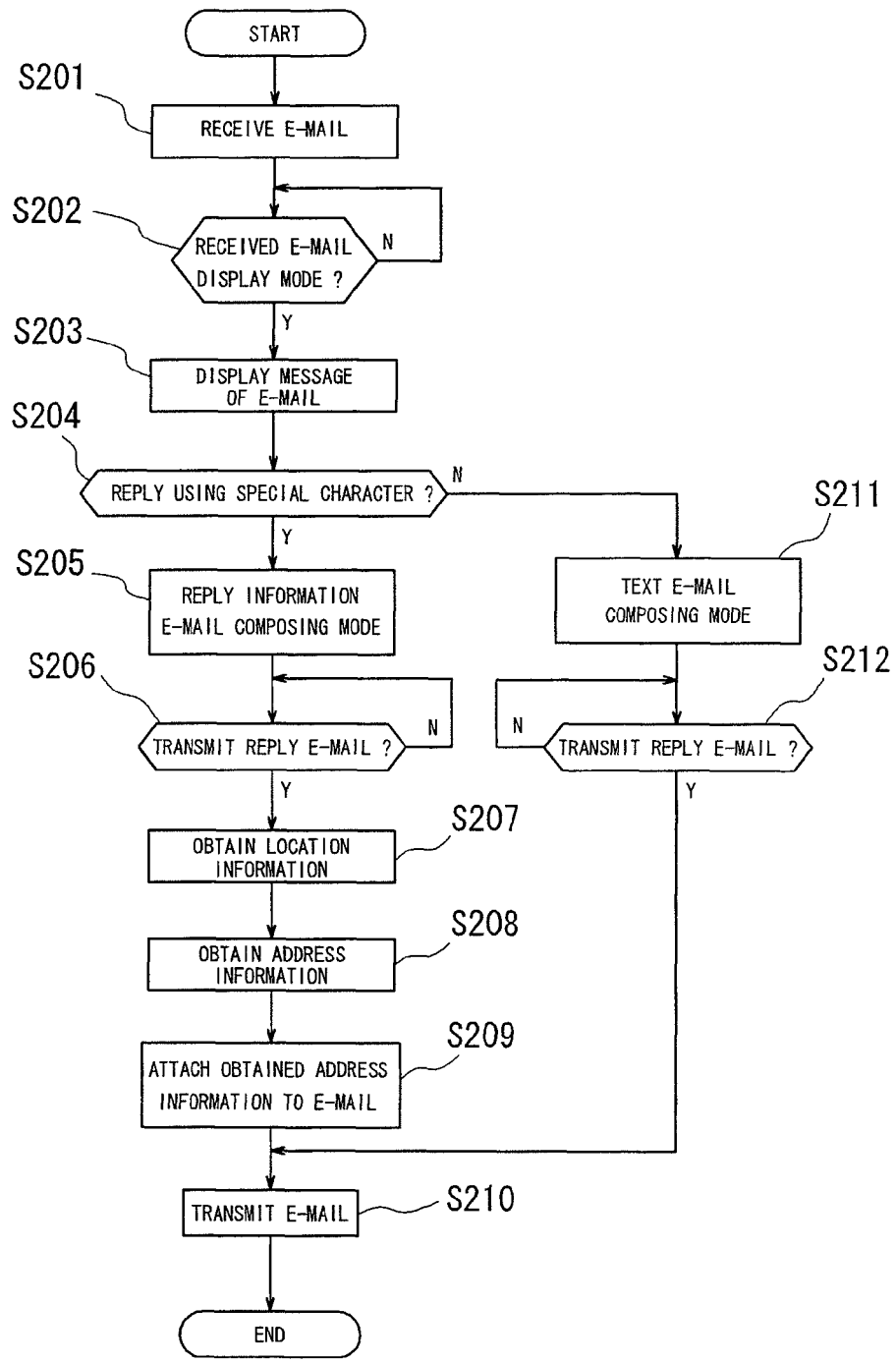
FIG. 4 is a flowchart illustrating an operation to receive the e-mail and reply by the reception side terminal according to the first embodiment.

Next, operations to receive and reply to an e-mail by the cellular phone 10 on the reception side according to the present embodiment are described with reference to a flowchart in FIG. 4 and examples of display on the screen in FIG. 5. Here, it describes about the cellular phone 10 of the reception side terminal which receives the e-mail including the predetermined special character (special character for inquiry) having associated therewith the information reply request from the cellular phone 10 of the transmission side terminal described above and replies to the e-mail. Although it is possible to receive a usual e-mail without the predetermined special character and reply to the usual e-mail by composing a usual e-mail, such operation is the same as reception and transmission of the e-mail using conventionally known mobile terminals and thus a description thereof is omitted.

First, the control unit 30 of a reception side cellular phone 10 controls the communication unit 20 to receive the e-mail transmitted from the transmission side terminal through the base station via the antenna (step S201). When the e-mail is thereby received, the control unit 30 stores the received e-mail in the memory unit 24. At this time, the determination unit 34 determines whether the predetermined special character (special character for inquiry) with which the information reply request is associated is included in the received e-mail. When the special character for inquiry is included in the e-mail, the control unit 30 also stores the information reply request attached in association with the special character for inquiry in the memory unit 24.

When the e-mail is stored, the control unit 30 determines whether the user has operated the input unit 12 to shift to a received e-mail display mode such that the user of the reception side terminal can view the e-mail (step S202). If the user has operated to shift to the received e-mail display mode, the control unit 30 retrieves a message of the e-mail together with the special character for inquiry from the memory unit 24 and controls the display unit 14 to display them (step S203). For example, when the e-mail received from the transmission side terminal includes only the special character for inquiry 'WHERE?', the display unit 14 displays a screen as shown in FIG. 5(*a*).

Figure 5:
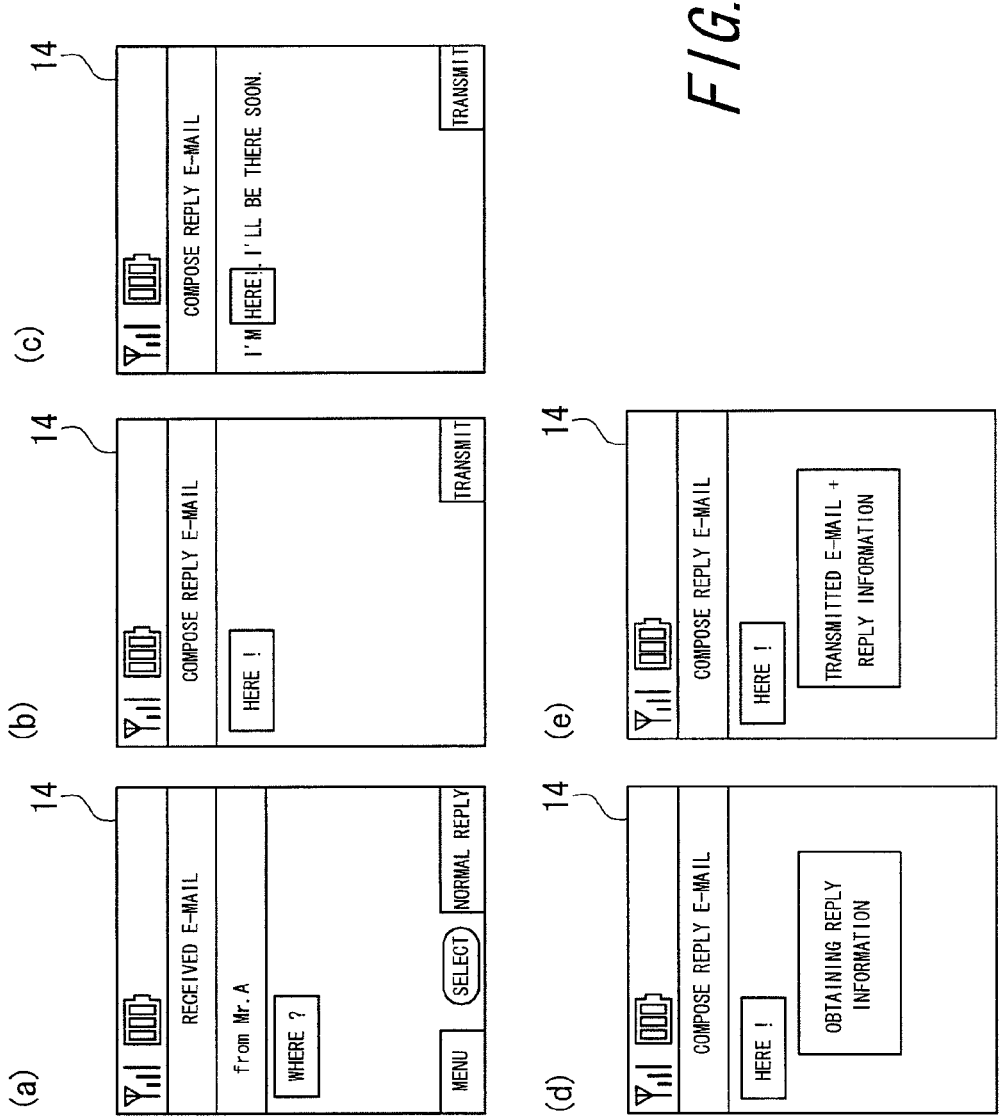
FIG. 5 is a diagram illustrating examples of display on the display unit of the reception side terminal according to the first embodiment.

The special character for inquiry included in the e-mail is displayed on the display unit 14 to be distinguishable from characters used to compose a usual e-mail, as shown in FIG. 5(*a*), for example. In FIG. 5(*a*), a name of a sender of the e-mail is shown in a column 'from' to show that the e-mail being displayed is transmitted from a user registered under a name of Mr. A. In descriptions hereinafter, the user operating the cellular phone 10 of the transmission side is referred to as Mr. A, whereas the user operating the cellular phone 10 of the reception side is referred to as Mr. B.

After displaying the message of the e-mail including the special character for inquiry on the display unit 14 at step S203, the e-mail composing unit 32 determines whether to reply by using the special character for inquiry or to reply without using the special character for inquiry in accordance with an operation by the user (step S204). An operation to reply using the special character for inquiry, i.e. based on the information reply request associated with the special character for inquiry is hereinafter referred to as a "reply information e-mail composing mode", for convenience. In addition, an operation to reply without using the special character for inquiry, that is, to reply only with conventional textual information and not responding to the information reply request is hereinafter referred to as a "text e-mail composing mode".

When displaying the special character for inquiry (pictorial symbol of 'WHERE?', in this case) with which the information reply request is associated, together with the message on the display unit 14, the control unit 30 controls the special character for inquiry to be selected in response to an input operation (such as a key pressing operation) to the input unit 12 by the user of the reception side. The e-mail composing unit 32 shifts the cellular phone 10 to the reply information e-mail composing mode in response to an input operation to select the special character for inquiry (step S205). In the reply information e-mail composing mode, the e-mail composing unit 32, based on the information associated with the special character for inquiry retrieved from the memory unit 24, controls the display unit 14 to display a predetermined special character (special character for reply) for reply in association with a reply information, which is information to respond to the information reply request by the sender of the e-mail. The special character for reply may take any forms such as, for example, a special character, a symbol, a pictorial symbol, a picture, a mark and an icon, as long as they can be distinguished from normal characters used in the e-mail. However, it is preferable that the special character for reply is in a form which enables a user to recognize that it is a special character for responding to the special character for inquiry included in the e-mail from the transmission side.

For example, a case where the special character for inquiry 'WHERE?' as shown in FIG. 5(a) is selected to shift to the reply information e-mail composing mode is described. In this case, the e-mail composing unit 32 displays a reply e-mail composing screen which shows a pictorial symbol depicting 'HERE!' from the beginning as the special character for reply corresponding to the information reply request from the transmission side, on the display unit 14. The special character for reply can be treated as a simple pictorial symbol included in the e-mail and it is possible to compose a reply e-mail with a message as "I'm 'HERE!'. I'll be there soon." shown in FIG. 5(c), for example. The following is a description about a case of composing an e-mail including only the special character for reply 'HERE!' as shown in FIG. 5(b), as an example responding to the information reply request of a corresponding party in a simplest manner.

After completing to compose a reply e-mail including the special character for reply with which reply information will be associated, the e-mail composing unit 32 determines whether the user operates the input unit 12 to start the e-mail transmission process for the e-mail composed (step S206). When input is performed to start the e-mail transmission process, that is, when the icon "TRANSMIT" shown in a lower right of FIG. 5(b) is selected, the e-mail composing unit 32 encodes data of this e-mail. In the encoding process, the e-mail composing unit 32 associates predetermined reply information with the special character for reply included in the message of the e-mail.

In the present embodiment, the predetermined reply information of the reception side terminal in response to the information reply request from the transmission side terminal is information on the present location of the reception side terminal, in particular. In order to obtain information on the present location, the e-mail composing unit 32 controls the GPS processing unit 22 to obtain the location information by the GPS as the present location of the cellular phone 10 (step S207). At this point, the GPS processing unit 22 is controlled by the e-mail composing unit 32 to receive radio waves from the GPS satellite by using the GPS antenna and thereby calculates the location information (for example, latitude and longitude) of the terminal itself. Since techniques to obtain the location information of the terminal itself with a positioning system using the GPS are known in the art, a detailed description thereof is omitted.

Next, the e-mail composing unit 32 controls the communication unit 20 to transmit the location information obtained by GPS to an external server (not shown) via the antenna thereof. On reception of the location information based on the GPS from the cellular phone 10, the external server 10 searches for address information corresponding to the location information and transmits a reply including a result of the search to the cellular phone 10. By the reply from the external server, the cellular phone 10 obtains the address information of the terminal itself (step S208). Techniques to transmit the present location information to the external server and receive the reply including the address information corresponding to the present location are also known in the art, a detailed description thereof is omitted. During the process at step S207 and S208, the control unit 30 may display a screen as shown in FIG. 5(d), for example, on the display unit 14 so as to inform the user that the reply information (the present location information and the address information based thereon) is being obtained.

On obtaining the reply information, the e-mail composing unit 32 attaches the reply information obtained to the e-mail by associating the information with the special character for reply (the pictorial symbol 'HERE', in this case) in the e-mail (step S209). Next, the control unit 30 encodes the e-mail and controls the communication unit 20, by referring an e-mail address of the transmission side terminal based on header information of the received e-mail, to transmit the e-mail having the reply information attached thereto to the transmission side terminal (step S210). After completing to transmit this e-mail, the control unit 30 may display a screen as shown in FIG. 5(e), for example, on the display unit 14 so as to inform the user that the reply information is transmitted together with the e-mail message.

When the reception side transmits an e-mail not including the special character for reply in response to the received e-mail including the special character for inquiry at step S204, that is, transmits the e-mail without the reply information and with not responding to the information reply request from the transmission side terminal, a process proceeds to step S211. After shifting to the text e-mail composing mode at step S211, the e-mail composing unit 32 composes the reply e-mail using only usual characters, and then transmits the reply e-mail at step S212.

Accordingly, in the present embodiment, as a simplest operation, the reception side terminal which received the information reply request from the transmission side terminal can prepare the reply e-mail including the special character for reply with which the reply information is associated, based on the user operation to simply select the special character for inquiry included in the received e-mail. After preparing the reply e-mail, it is possible to automatically obtain the present location information and the address information of the reception side terminal requested by the user of the transmission side terminal and to attach them to the reply e-mail to be transmitted, only by the user operation to transmit the reply e-mail. Hence, even the user who is not good at operating devices can respond to the inquiry about the location by operating his mobile terminal in a significantly simple manner.

Figure 6:
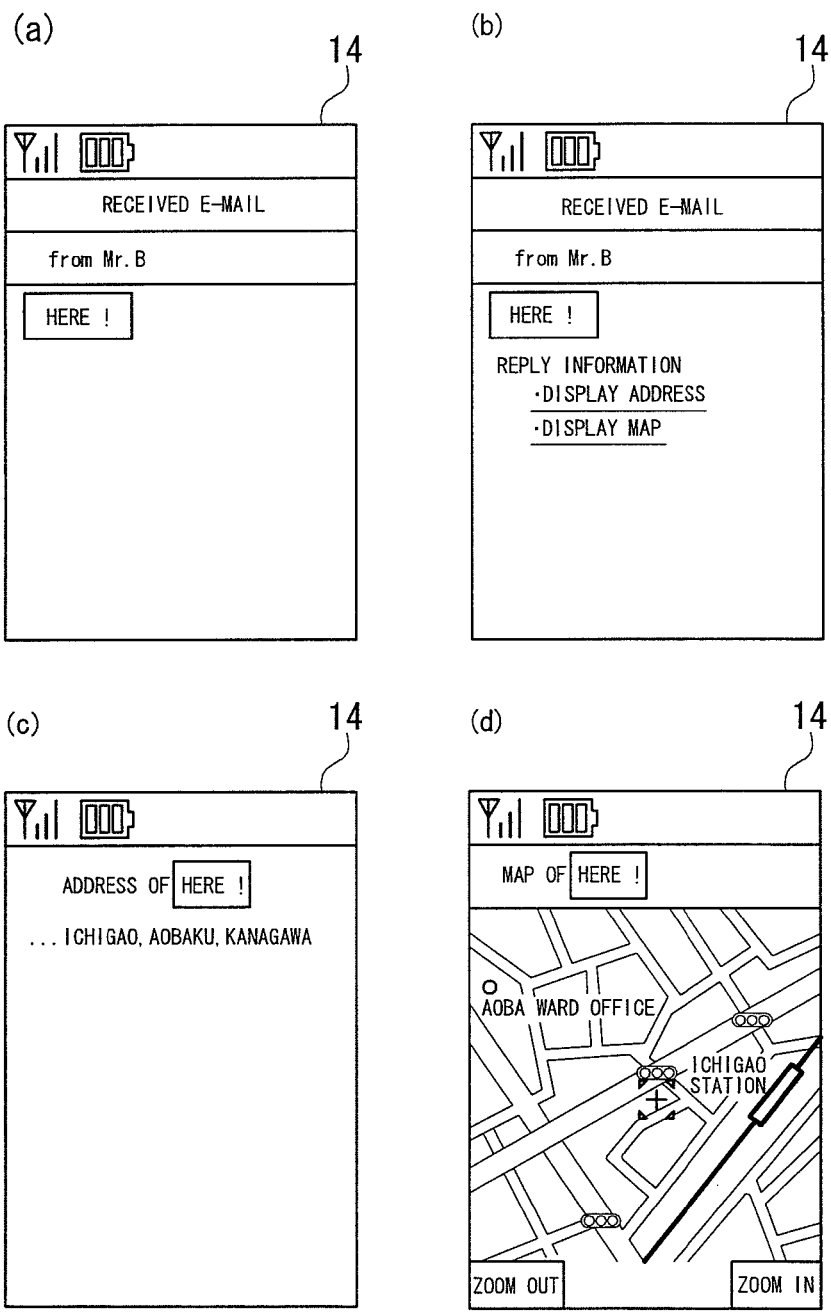
FIG. 6 is a diagram illustrating examples of display on the display unit of the transmission side terminal when receiving a reply e-mail according to the first embodiment.

The cellular phone 10 (of the user Mr. A) which received the reply e-mail can display the message of the reply e-mail received on the display unit 14, as shown in FIG. 6(a) for example in this case. The special character for reply included in the reply e-mail is associated with the present location information and the address information of the cellular phone (of the user Mr. B) which transmitted the reply e-mail. Therefore, the control unit 30, in response to an input operation of the user Mr. A using the input unit 12 to select the special character for reply, for example, displays the information associated with the special character for reply as shown in FIG. 6(*b*). Then, in response to an input operation to select 'DISPLAY ADDRESS' as shown in FIG. 6(*b*), the control unit 30 displays the address information of the user Mr. B on the display unit 14 as shown in FIG. 6(*c*). In addition, the control unit 30, in response to an operation to select the 'DISPLAY MAP' as shown in FIG. 6(*b*), by transmitting the address information to the external server (not shown) to request for reply with map information corresponding to the address and obtaining the map information, displays a map as shown in FIG. 6(*d*), for example, on the display unit 14.

As set forth above, the user Mr. A who wishes to know the present location of the corresponding party can quickly inquire about the location of the corresponding party by a simple operation. In addition, the user Mr. B who receives the inquiry about the location can compose and transmit a reply e-mail easily and quickly in response to the inquiry based on the received e-mail. Moreover, the user Mr. A who receives the reply e-mail can know the present location of the user Mr. B quickly by a simple operation.

Furthermore, the user can protect privacy when receiving the information reply request through an e-mail including the special character for inquiry. In particular, the user who received the information reply request can make a selection whether to inform the corresponding party of the present address or place of the user by replying with the reply information, to reply with the normal e-mail without the reply information (that is, without disclosing the location information of the user), or even not to reply. Hence, it is possible to disclose the information of the terminal itself only to intended corresponding parties.

Second Embodiment

In the second embodiment, differently from the first embodiment described above, the transmission side terminal requests a corresponding terminal to reply with not only information on the present location and the address information thereof but also other information selected from a variety of information, and the reception side terminal obtains information in accordance with the information reply request and transmits them to the transmission side terminal. Therefore, the e-mail composing unit 32 of the transmission side cellular phone 10 according to the present embodiment has a selection unit (not shown) not only to display items of a variety of information on the corresponding terminal to request on the display unit 14 but also to receive selection of the items to request for reply.

The following is a description of an operation to transmit the e-mail by the transmission side cellular phone 10 according to the present embodiment, with reference to the examples of the display screen shown in FIG. 7 and a flowchart shown in FIG. 8.

The transmission side cellular phone 10 according to the present embodiment, in the same manner as that according to the above first embodiment, when the user of the transmission side who wishes to know the present location and the likes of the corresponding party composes an e-mail, allows the user to include the special character for inquiry in the e-mail as shown in FIG. 7(*a*) and transmit the e-mail. In the same manner as the above first embodiment, the case of composing the e-mail including only the special character for inquiry 'WHERE?' is described below as an example to inquire in the simplest manner about information such as the present location of the corresponding party.

If the special character for inquiry is detected in the e-mail being composed (Yes of step S102) in the e-mail composing mode at step S101 shown in FIG. 8, the selection unit of the e-mail composing unit 32 receives input to select the information on the reception side terminal to associate as the information reply request with the special character for inquiry (step S301). For example, items of the information that the transmission side terminal can request to the reception side terminal are displayed on the display unit 14 as shown in FIG. 7(*b*), for example, so as to receive input by the user of the transmission side terminal to select desired items. FIG. 7(*b*) shows, as an example of the information request selecting operation, a state where the present location of the corresponding party, transportation, nearest station, nearby landmark, traffic report and the likes are listed, and the user of the transmission side selects the present location and the transportation among the items.

When an input operation is performed to confirm the selected items of the information reply request at step S302, that is, when an icon 'CONFIRM' shown in a lower right of FIG. 7(*b*) is selected, the e-mail composing unit 32 attaches information on the information rely request selected to the e-mail by associating the information with the special character for inquiry (step S103).

After completing to compose the e-mail, the control unit 30 determines whether the user has operated the input unit 12 to start the e-mail transmission process to transmit the completed e-mail (step S104). When the user inputs to start the e-mail transmission process, that is, the icon 'TRANSMIT' in the lower right of FIG. 7(*a*) is selected on the screen which is returned to the original state after the information request selection shown in FIG. 7(*b*) is confirmed, the control unit 30 encodes this e-mail and transmits it (step S105). After the e-mail transmission process, the display unit 14 may display a screen as shown in FIG. 7(*c*), for example, so as to inform the user that the selected information reply request is transmitted together with the message of the e-mail to the corresponding party (only the special character for inquiry, in this example).

As described above, according to the present embodiment, the user who wishes to know the present location and other information of the corresponding party can quickly transmit the reply request of the location information and other information through significantly simple operations, including the predetermined special character for inquiry in the normal e-mail and selecting desired information about the reception side terminal.

The following is a description of an operation to receive and reply to the e-mail by the reception side cellular phone 10 according to the present embodiment, with reference to a flowchart in FIG. 9. In the operation of the reception side terminal according to the present embodiment, when transmitting the reply e-mail in the reply information e-mail composing mode of the reception side terminal according to the first embodiment (step S206), the e-mail composing unit 32 obtains the location information and the address information. According to the present embodiment, furthermore, the e-mail composing unit 32 controls corresponding units to perform processing to obtain various information necessary as the reply information in accordance with the information reply request from the transmission side terminal.

More particularly, when the reply e-mail having associated therewith the reply information in accordance with the information reply request is composed in the reply information e-mail composing mode at step S205 and the e-mail transmission process is started (Yes of step S206), the operation shifts to step S401. At step S401, the e-mail composing unit 32 controls each function unit to analyze items of the information reply request associated with the special character for inquiry in the e-mail received from the transmission side terminal and to obtain the information corresponding to the items as the reply information.

For example, if information on 'PRESENT LOCATION' is requested by the information reply request, the e-mail composing unit 32 controls the GPS processing unit 22 in the same manner as the first embodiment to receive radio waves from the GPS satellite and thereby obtains the location information of the terminal itself. Furthermore, the e-mail composing unit 32 controls the communication unit 20 to communicate with the external server as necessary, so as to convert the location information into the address information.

In addition, if information on 'TRANSPORTATION' is requested by the information reply request and it is detected that the terminal has passed through the automatic ticket gate of a station by reading a usage history of the non-contact IC card function unit 26, for example, it is regarded that the user is on a train. It is also possible to regard that the user is on a bus when detecting that it is immediately after the non-contact IC card function unit 26 has communicated with an IC card reader/writer installed in the bus, or that the user is in a taxi in a similar manner, and to include such result in the reply information. Moreover, if it is detected that it is immediately after the terminal has communicated with the IC card reader/writer terminal in a shop as the user purchased something with electronic money, it is possible to include the reply information such as 'NO' transportation and 'NEAR THE SHOP' in the reply e-mail.

Furthermore, if the present location information has been obtained by the GPS processing unit 22, it is also possible to inquire about various kinds of relevant information to the present location by using conventional techniques by transmitting the location information to appropriate external servers. For example, it is possible to include a name of a train station nearest from the present location as 'NEAREST STATION' information and a name of a nearby building which can be a landmark as 'NEARBY LANDMARK' in the reply information. In addition, traffic information near the present location and delay information of railway companies around the nearest station can be included as 'TRANSPORTATION' in the reply information.

Thereby, after obtaining all of the reply information corresponding to the information reply request received from the transmission side terminal, the e-mail composing unit 32 controls the reply information to be attached in association with the special character for reply in the reply e-mail (step S402). Then, the reply e-mail including the special character for reply is encoded and transmitted to the transmission side terminal (step S403). Other operations are the same as those in the first embodiment.

As set forth above, the user Mr. A who wishes to know not only the present location of the corresponding party but also various relevant information can inquire about them quickly by a simple operation. In addition, the user Mr. B who received the inquiry can compose and transmit the reply e-mail in response to the inquiry based on the received e-mail quickly in a simple manner.

Moreover, the user Mr. A who received the reply e-mail can know not only the present location of the user Mr. B but also the relevant information quickly by a simple operation. For example, a case is exemplified where the transmission side terminal of the user Mr. A transmits an e-mail including the information reply request selected as shown in FIG. 7(b). In this case, if the reception side terminal of the user Mr. B transmits a reply e-mail including the reply information in accordance with the information reply request, the transmission side terminal of the user Mr. A who received the reply e-mail can view the information on the present location and transportation corresponding to the information reply request.

Third Embodiment

According to the third embodiment, the transmission side terminal can request a reply including not only the present location and the address information of the corresponding party but also various information of the corresponding party selectively in the same manner as the above second embodiment, and the reception side terminal can select one among items of the information reply request received and transmit the reply information to the transmission side terminal. Therefore, the e-mail composing unit 32 of the reception side cellular phone 10 according to the present embodiment has a selection unit (not shown) for displaying the items of the information reply request received on the display unit 14 and receiving selection of items of the reply information to transmit based on input from the input unit 12.

The following is a description about the operation to receive and reply to the e-mail by the reception side cellular phone 10 according to the present embodiment, with reference to a flowchart shown in FIG. 10 and examples of the display screen shown in FIG. 11. Since the operation to transmit the e-mail by the transmission side cellular phone 10 according to the present embodiment is the same as that of the second embodiment, a description thereof is omitted.

The operation of the reception side cellular phone 10 according to the present embodiment differs from the operation to compose the reply e-mail in the reply information e-mail composing mode according to the second embodiment, that is, the operation after step S205. At step S205, the e-mail composing unit 32 controls the display unit 14 to display items of the information reply request selected and associated with the special character for inquiry in the e-mail received from the transmission side terminal. Next, the selection unit of the e-mail composing unit 32 receives an input to select items of information, among the information reply request displayed, to permit to be disclosed as the reply information based on an input operation by the user using the input unit 12 (step S501). Then, when input by the user to confirm the items of the reply information to transmit is detected at step S502, the e-mail composing unit 32 performs the transmission process of the reply e-mail and performs the same operation as that of the second embodiment after step S206.

When receiving the e-mail having the selected information reply request attached thereto through the operation described above, the reception side cellular phone 10 displays the received e-mail including the special character for inquiry on the display unit 14 as shown in FIG. 11(a), for example. Then, when the operation shifts to the reply information e-mail composing mode in response to a selecting input of the special character for inquiry, the reception side cellular phone 10 displays the items of the information reply request inquired by the user of the transmission side terminal, as shown in FIG. 11(b). In an example shown in FIG. 11(b), the information reply request selected and transmitted by the user Mr. A of the transmission side terminal includes 4 items of "PRESENT LOCATION', 'TRANSPORTATION', 'NEAREST STATION' and 'NEARBY LANDMARK'. By input to select the information to permit to be disclosed among the items and to confirm it, the user Mr. B of the reception side terminal transmits the reply information selectively. In the example shown in FIG. 11(b), the user of the reception side terminal selects 3 items of "PRESENT LOCATION', 'TRANSPORTATION' and 'NEAREST STATION', among items of the information reply request, so as to permit to be disclosed as the reply information.

It is to be noted that, according to the present embodiment, when the user of the reception side terminal selects items of the reply information among the items of the information reply request, the terminal can be controlled to automatically obtain contents of the reply information or to determine the contents of the reply information depending on the selecting input by the user, in accordance with the items selected.

That is, for information of the 'PRESENT LOCATION', for example, it is possible to select 'Automatic Acquisition' or 'User Input'. For the 'Automatic Acquisition', the location information of the terminal that the e-mail composing unit 32 obtains by controlling the GPS processing unit 22 is used as the reply information. For the 'User Input', the user is prompted to input following instructions of a screen (display unit 14) and the information based on the input by the user is used as the reply information. For example, it may happen that the reception side cellular phone 10 does not have the GPS function or cannot use the GPS function as being in an area incapable of receiving the radio waves from the GPS satellite. In such cases, the input unit 12 receives input of the textual information by the user and the e-mail composing unit 32 uses the textual information that the user input as the information on the present location. Alternatively, it is also possible to support input of the address information by narrowing down to a name of a place by selecting from among alternatives sequentially. FIG. 11(*c*) shows that it is set to automatically obtain the present location by using the GPS function of the cellular phone 10.

In regard to information on 'TRANSPORTATION', it may happen that, for example, the cellular phone 10 does not have a function to automatically determine the transportation or cannot use the function. In such cases, the e-mail composing unit 32, as shown in FIG. 11(*c*), can list candidates for transportations currently available and receive user input to select one among the candidates so as to use the information as the reply information.

By selecting one between the automatic acquisition and the user input in accordance with the items of the information reply request as described above, it is possible to improve accuracy (preciseness) of the reply information to transmit to the corresponding party. Selection between the automatic acquisition and the user input may be determined by the user each time the user selects the reply information among the information reply request after starting the reply information e-mail composing mode, preset as a user setting for each of the items, or determined based on an initial setting.

After the user of the reception side terminal confirms the selection of the reply information and completes to compose the reply e-mail, a screen as shown in FIG. 11(*d*) is displayed on the display unit 14 so as to receive input to start transmission. Then, when the transmission process is started by input to start the transmission (selection of the icon 'TRANSMIT'), a screen as shown in FIG. 11(*e*) can be displayed so as to indicate that the selected reply information is being obtained. After completion in obtainment of the reply information, it is preferred to display a screen as shown in FIG. 11(*f*) so as to inform the user that the selected reply information has been transmitted together with the e-mail.

Figure 12:
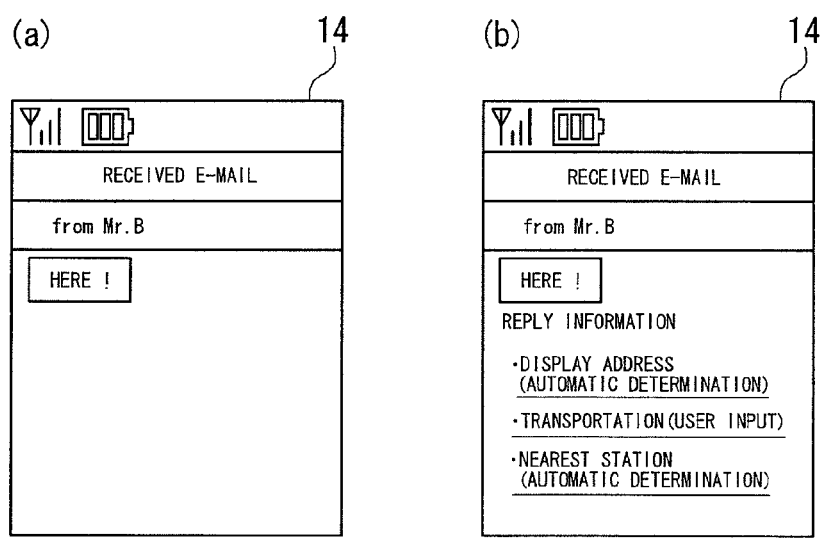
FIG. 12 is a diagram illustrating examples of display on the display unit of the transmission side terminal when receiving the reply e-mail according to the third embodiment.

FIG. 12(*a*) shows an example of a state where the transmission side terminal which received the reply e-mail transmitted from the reception side terminal as described above displays the reply e-mail on the display unit 14. In this example, the reply e-mail transmitted from the reception side terminal is composed of only the special character for reply (the pictorial symbol 'HERE!') with which the reply information is associated.

Various reply information such as the location information of the reception side terminal, which the user of the reception side terminal permitted to be disclosed among items of the information reply request, is associated with the special character for reply. Therefore, based on input to select the special character for reply by the user of the transmission side terminal, the control unit 30 displays items of the reply information selected and transmitted by the user of the reception side as shown in FIG. 12(*b*), for example. Based on input to select the reply information by the user of the transmission side terminal, the control unit 30 displays various kinds of reply information associated with the special character for reply on the display unit 14. It is preferred to show accuracy of each item of the information to the user of the transmission side terminal by indicating whether the information is automatically obtained by the reception side terminal or is based on input by the user of the reception side terminal, for each item of the reply information, as shown in FIG. 12(*b*).

Thereby, the user Mr. A of the transmission side terminal who wishes to know not only the present location of the corresponding party but also various kinds of relevant information can inquire for them quickly by a simple operation. In addition, the user Mr. B who received the inquiry may select the information to permit to be disclosed among the inquires based on the received e-mail, easily and quickly compose the reply e-mail and transmit it. Moreover, the user Mr. A who received the reply e-mail can also know the information permitted to be disclosed by the user Mr. B quickly by an easy operation.

Fourth Embodiment

According to the fourth embodiment, if the 'TRANSPORTATION' information is included in the information reply request transmitted by the transmission side terminal in the above second and the third embodiments, the transportation being used by the user of the reception side terminal is estimated easily but highly accurately, as the reply information corresponding to the 'TRANSPORTATION' information.

Figure 13:
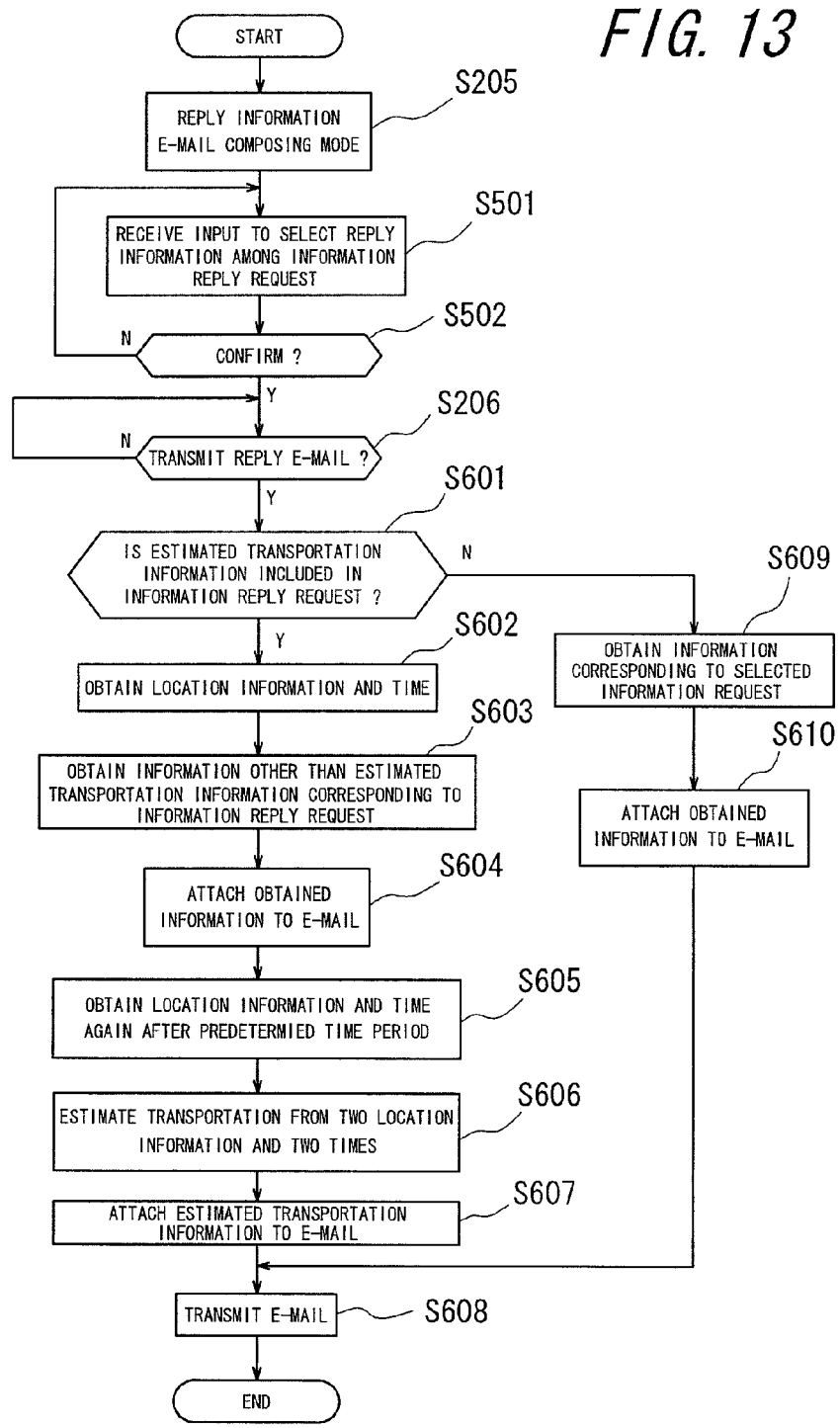
FIG. 13 is a flowchart illustrating an operation to reply with an e-mail by the reception side terminal according to a fourth embodiment.
Figure 14:
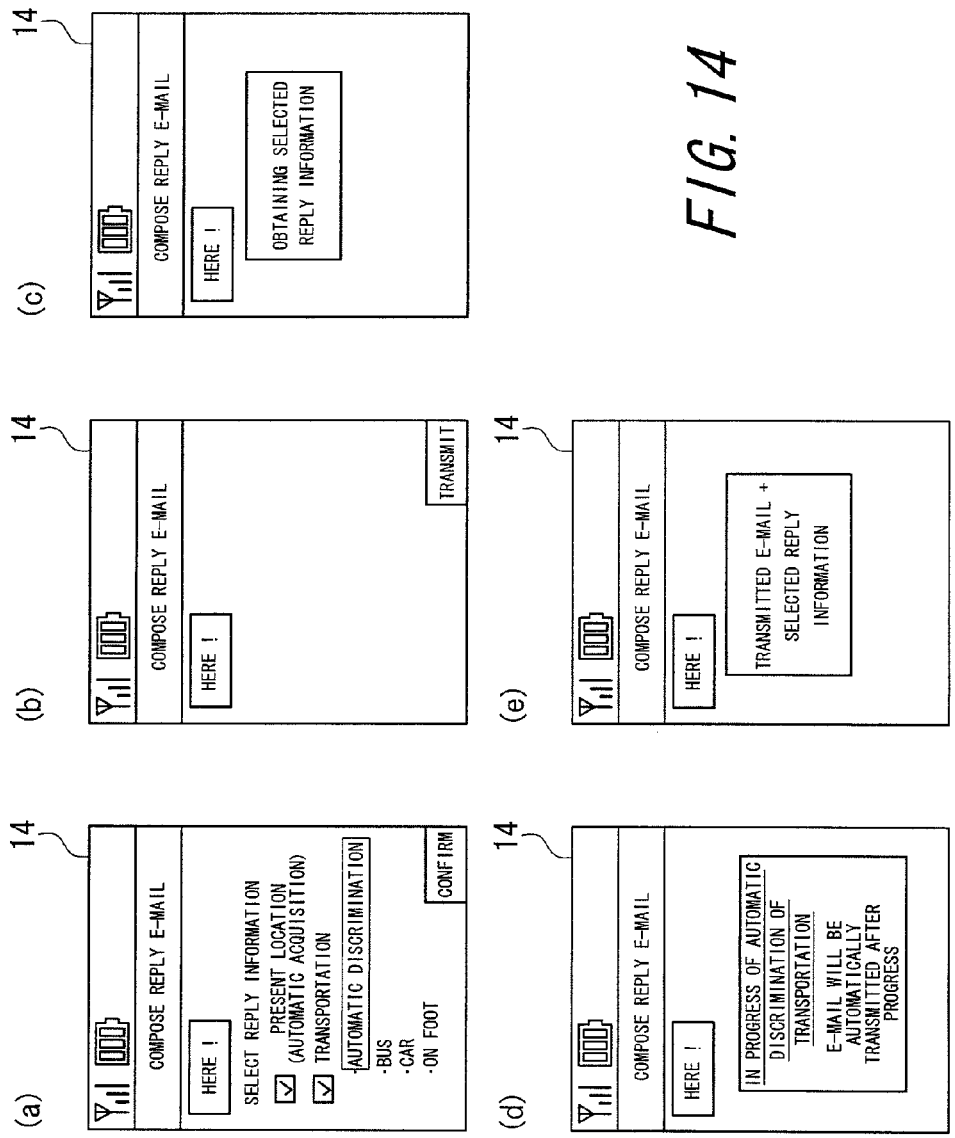
FIG. 14 is a diagram illustrating examples of display on the display unit of the reception side terminal according to the fourth embodiment.

The following is a description about an operation to estimate the transportation when the reception side cellular phone 10 transmits the reply e-mail according to the present embodiment, with reference to a flowchart shown in FIG. 13 and examples of the display screen shown in FIG. 14. It is to be noted that the operation to transmit the e-mail by the transmission side cellular phone 10 according to the present embodiment and the operation of the reception side cellular phone 10 from reception of the e-mail including the information reply request to shift to the reply information e-mail composing mode in response to the e-mail (step S205) are the same as those in the second and the third embodiment. Therefore, descriptions of those operations are omitted.

At step S205, the reply e-mail is composed by selecting items about the information of the reception side terminal to permit to be disclosed as the reply information among items of the information reply request from the transmission side terminal and associating the reply information with the special character for reply. FIG. 14(*a*) shows an example of screen display when the user performs an input operation such that the reception side terminal automatically obtains the present location and automatically discriminates the transportation among the items of the information reply request of the transmission side terminal. Composing of the reply e-mail is completed when this input by the user is confirmed (Yes of step S502).

At step S206, when a screen as shown in FIG. 14(*b*) is displayed and the reply e-mail composed starts to be transmitted by user's operation (selection of the icon 'TRANSMIT'), the operation shifts to step S601. At step S601, the e-mail composing unit 32 determines whether the items of the information reply request included in the reply e-mail to transmit includes the request for information on the transportation of the corresponding party estimated by automatic determination. If the reply information selected in accordance with the information reply request includes the request for the information on the transportation estimated by automatic determination, the e-mail composing unit 32 controls the GPS processing unit 22 to obtain the location information of the terminal itself and obtains a present time from the timing unit 28 (step S602). At this point, it is preferred to display as shown in FIG. 14(*c*), for example, to inform the user that the necessary information is being obtained.

Next, if the reply information includes not only the information on the transportation but also information necessary to obtain by internal processing of the cellular phone 10 or by communication with an external server, the e-mail composing unit 32 obtains corresponding reply information by controlling function units (step S603). Then, the e-mail composing unit 32 attaches the information obtained to the reply e-mail (step S604).

After obtaining necessary information, the e-mail composing unit 32 again obtains, at a predetermined time interval, the location information of the terminal itself and the present time at which the location information is obtained (step S605). After obtaining the location information and time information for the second time, the e-mail composing unit 32 controls the communication unit 20 to transmit two pairs of the location information and the time information to an external server (not shown). When receiving two pairs of the location information and the time information, the external server first determines whether the reception side terminal is moving along a railway or a street, or not moving but staying in a building, by using two detected locations and calculates a moving distance between the two locations and a time difference between the detected points of two locations. Next, an average moving speed is calculated from the moving distance between the two points obtained and a time taken to move between the two points, and thereby a transportation used to move between the two points is estimated from results of them (step S606).

This estimation of the transportation is performed based on information such as two locations of the reception side terminal, time information and the average moving speed obtained by the external server. For example, when it is determined that the both locations detected are on the railway and the average moving speed is 50 km per hour, from the times detected twice and the distance, it is possible to estimate the transportation as "moving on a train" and, furthermore, to determine a name of the train line from the detected locations. In addition, for example, when it is determined that the locations detected twice are both on the street and the average moving speed is no less than a predetermined speed from the times detected twice and the distance, it is possible to estimate the transportation as "moving by a car (or bus)". Moreover, for example, when the average moving speed is below a predetermined speed, it is possible to estimate the transportation as "moving on foot". It is further possible to determine a name of the street from the detected locations.

The external server transmits the information on a result of estimation for the transportation obtained thereby to the reception side terminal. When the reception side terminal receives information on estimated transportation of the terminal itself, the e-mail composing unit 32 attaches the information on estimated transportation to the reply e-mail (step S607) and transmits the reply e-mail (step S608).

Since it is considered that it may require a while to obtain information on location and time for the second time after the transmission processing of the e-mail is started, in such a case it is preferred to display as shown in FIG. 14(*d*) and to indicate that the reply e-mail including the reply information will be automatically transmitted after obtaining the information for the second time. It is also possible to display the screen as shown in FIG. 14(*e*) when transmission of the reply e-mail is completed by obtaining the information on the estimated transportation and attaching the information to the reply e-mail, so as to inform the user of completion of the transmission of the reply e-mail including the reply information. In addition, the time interval to obtain the location and time information twice may be set in advance assuming a certain movement of the terminal in the period of time or may use appropriate information pairs among location and time information obtained for several times at predetermined intervals.

If the items of the information reply request included in the reply e-mail to be transmitted does not include the request to estimate the transportation of the corresponding party by automatic determination at step S601, the same operations are performed as those at the steps S401 and S402 in FIG. 9 according to the second embodiment (steps S609 and S610).

In the transmission side terminal which received the reply e-mail transmitted from the reception side terminal as described above, when the mode to display the reply e-mail received is started, the special character for reply having the reply information associated therewith is displayed on the display unit 14 as shown in FIG. 15(*a*), for example. Based on user input to select the special character for reply using the input unit 12, the items of the reply information associated with the special character for reply are displayed as shown in FIG. 15(*b*), for example. In FIG. 15(*b*), for example, the information on the present location automatically determined and on the transportation automatically discriminated is associated as the reply information with the specific character for reply.

In response to user input to select the 'PRESENT LOCATION' on the display shown in FIG. 15(*b*), the transmission side terminal displays the address information as contents of the present location by texts as shown in FIG. 15(*c*) in the same manner as the first embodiment, and displays the map information (see FIG. 6(*d*)) in response to user input to select 'DISPLAY MAP'.

Moreover, in response to user input to select 'TRANSPORTATION' on the display shown in FIG. 15(*b*), the transmission side terminal displays the estimated information on the transportation of the reception side terminal automatically discriminated and received from the external server on the display unit 14, as shown in FIG. 15(*d*) or (*e*). It is preferred to display the transportation on the display unit 14 neatly arranging words such as names of the train or street and the transportation based on the processing by the application incorporated in the cellular phone 10, such that the user can view them easily.

Accordingly, by responding to the information reply request through the automatic acquisition, the reception side terminal which received the reply request for the information on the transportation from the transmission side terminal can inform the corresponding party of significantly simple and accurate estimated information on the transportation.

It is to be noted that the present invention is not limited to the embodiments set forth above but may be varied or altered in a multiple of manners. For example, although the information that may be handled by each function of the mobile terminal 10 is divided into each of the above embodiments for convenience of description, the functions described in different embodiments may be joined appropriately or combined. Moreover, the selectable items of the information reply request in the second to fourth embodiments are purely examples, and a number of information can be exchanged in accordance with various kinds of information which can be obtained by the cellular phone 10 or by communicating with an external server.

In each of the above embodiments, the reception side cellular phone 10 converts the location information of the terminal itself obtained using the GPS processing unit 22 into the address information by accessing the external server before transmitting the reply information. However, it is also possible to design the whole system such that the reception side attaches the location information obtained using the GPS without converting it into the address information and the cellular phone 10 on the transmission side connects the external server appropriately to convert the location information into the address information.

In addition, according to each of the above embodiments, in order to convert the location information by the GPS to the address information, the cellular phone 10 accesses the external server such that the conversion process is performed by the server. However, it is also possible to store information on the relationship between the location information by the GPS and the address information in the memory unit 24 of the transmission side terminal or the reception side terminal in advance, so that the terminal performs conversion process to the address information without accessing the external server. Similarly to the address information, it is also possible to store the map information (data for drawing the map) in the memory unit 24 of the terminal in advance, so that the terminal draws the map from the location information by the GPS or the address information by referring to the memory unit 24 without accessing the external server.

In the fourth embodiment, the reception side terminal transmits the information thereon to the external server and requests the external server to reply with estimated information on transportation of the terminal. However, in this case also it is possible to store a database for estimating the transportation from the information that the reception side terminal obtains in the memory unit 24 of the reception side terminal in advance and estimate the transportation within the terminal based on the database.

Furthermore, in each of the above embodiments, the mobile terminal obtains its location information by receiving the radio waves from the GPS satellite. However, the location information of the terminal itself is not necessarily obtained by using the GPS but also may be obtained by, for example, estimating the location information of the terminal based on the location information of the base station specified by an base station ID included in information received in a communication with the base station. It is also possible to use both the location information by the GPS and the location information of the base station in combination and, if the location information by the GPS cannot be obtained, estimate the location information of the terminal itself by using the location information of the base station.

INDUSTRIAL APPLICABILITY

According to the present invention, a transmission side terminal composes an e-mail including a predetermined special character (special character for inquiry) with which an information reply request for obtaining information on a destination mobile terminal of the e-mail is associated. Thereby, it is possible to inquire about the information on the destination mobile terminal of the e-mail, by a simple and quick operation in a manner the corresponding party can easily respond. In addition, if a received e-mail includes the special character for inquiry, a reception side terminal composes a reply e-mail including a predetermined special character (special character for reply) with which reply information in accordance with the information reply request is associated. Thereby, it is possible to transmit information such as location information of the terminal itself by a simple and quick operation based on the information request form the transmission side, in a manner the terminal sending the information reply request can easily recognize.

The invention claimed is:

1. A mobile terminal comprising:
   a transmitter configured to transmit an e-mail from a user, the e-mail containing a header field containing a sender or a receiver e-mail address and a body field containing a message; and
   a processor configured to create a request e-mail containing an electronic message composed by the user, the request e-mail further containing a predetermined special character that is entered by the user into the electronic message, wherein, in response to the predetermined special character being entered into the electronic message, a reply request is automatically made by the request e-mail when it is received by a destination mobile terminal to which the request e-mail is transmitted by the transmitter, wherein the reply request is not text entered by the user during composition of the electronic message, and wherein the reply request instructs the destination mobile terminal that receives the request e-mail to reply with information concerning the location of the destination mobile terminal, wherein the processor thereafter receives a reply email from the destination mobile terminal that provides the location information.

2. The mobile terminal according to claim 1, wherein the processor is further configured to select information about the destination mobile terminal to request, and the reply request is further configured to request the information selected by the processor from the destination mobile terminal.

3. A mobile terminal comprising:
   a receiver configured to receive an e-mail containing an electronic message composed by a user of a second terminal, the e-mail being transmitted by the second terminal and containing a header field containing a sender or a receiver e-mail address and a body field containing the electronic message; and
   a processor configured to determine whether the e-mail received by the receiver contains a predetermined special character for inquiry entered by the user of the second terminal into the electronic message; and
   wherein, when the predetermined special character for inquiry is contained in the electronic message of the received e-mail, the processor automatically determines that a reply request for location information about a location of the mobile terminal is being made by the second terminal and, in response to the reply request, creates a reply e-mail containing a predetermined special character for reply for transmission to the second terminal, wherein the predetermined special character for reply, when the reply e-mail is received by the second terminal, provides the location information pertaining to the mobile terminal to the second mobile terminal.

4. The mobile terminal according to claim 3, wherein the processor is further configured to select a desired item from items requested by the reply request, and the predetermined special character for reply is further configured to provide the selected desired item to the second terminal.

5. The mobile terminal according to claim 3, further comprising a location information obtaining unit for obtaining location information of the mobile terminal,
 wherein the processor composes the reply e-mail including the location information of the mobile terminal obtained by the location information obtaining unit.

6. The mobile terminal according to claim 5, further comprising a timing unit for measuring present time,
 wherein the processor composes the reply e-mail including estimated transportation information of the mobile terminal, estimated based on the location information of the mobile terminal obtained by the location information obtaining unit and time information obtained by the timing unit.

\* \* \* \* \*